US007103964B2

(12) United States Patent
Vohlgemuth (10) Patent No.: US 7,103,964 B2
(45) Date of Patent: Sep. 12, 2006

(54) METHOD OF MANUFACTURING A CIRCUIT FOR AN ELECTRICAL MACHINE

(75) Inventor: Patrick Vohlgemuth, La Rochefoucauld (FR)

(73) Assignee: Moteurs Leroy-Somer, Angouleme (FR)

( * ) Notice: Subject to any disclaimer, the term of this patent is extended or adjusted under 35 U.S.C. 154(b) by 111 days.

(21) Appl. No.: 10/347,584

(22) Filed: Jan. 22, 2003

(65) Prior Publication Data

US 2004/0010907 A1    Jan. 22, 2004

(30) Foreign Application Priority Data

Feb. 11, 2002  (FR) ................................. 02 01647

(51) Int. Cl.
*H01F 7/06* (2006.01)
(52) U.S. Cl. .................... 29/605; 29/592.1; 29/596; 29/587; 83/25; 83/42; 83/103; 242/431; 242/443; 242/447; 310/216; 310/254; 310/258; 310/259
(58) Field of Classification Search ............... 29/592.1, 29/595, 596, 597, 598, 605; 310/216, 254, 310/258, 259; 83/25, 42, 103; 242/431, 242/443, 447
See application file for complete search history.

(56) References Cited

U.S. PATENT DOCUMENTS

| | | | | |
|---|---|---|---|---|
| 3,320,451 A | | 5/1967 | Wiley | |
| 3,604,464 A | * | 9/1971 | Pelley et al. ................. | 138/154 |
| 3,628,241 A | * | 12/1971 | Toyoda et al. ................. | 29/605 |
| 3,842,493 A | | 10/1974 | Ohuchi et al. ................. | 29/596 |
| 3,854,355 A | | 12/1974 | Anefall ........................... | 83/50 |
| 3,890,863 A | | 6/1975 | Reihle et al. ................... | 83/71 |
| 4,102,040 A | | 7/1978 | Rich ............................. | 29/598 |
| 4,365,180 A | | 12/1982 | Licata et al. ................. | 310/216 |
| 4,452,596 A | * | 6/1984 | Clauss et al. ................ | 493/107 |
| 4,625,957 A | * | 12/1986 | DuFresne .................... | 271/214 |
| 4,654,552 A | | 3/1987 | Fritzsche ..................... | 310/216 |
| 4,816,711 A | | 3/1989 | Fritzsche ..................... | 310/216 |
| 5,141,219 A | * | 8/1992 | Watts et al. ................. | 271/203 |
| 5,248,106 A | * | 9/1993 | Biagiotti ..................... | 242/523.1 |
| 5,729,072 A | | 3/1998 | Hirano et al. ................ | 310/258 |
| 5,859,486 A | | 1/1999 | Nakahara et al. ............ | 310/254 |
| 6,049,153 A | | 4/2000 | Nishiyama et al. ......... | 310/156 |
| 6,147,431 A | | 11/2000 | Asao et al. .................. | 310/254 |

(Continued)

FOREIGN PATENT DOCUMENTS

DE        2 053 823        5/1972

(Continued)

OTHER PUBLICATIONS

"Prediction of the heat transfer from the end winding of a TEFC strip-wound induction"; Mugglestone, J.; Pickering, S.J.; Lampard, D.; Electric Machines and Drives, 1999. International Conference IEMD '99 , May 9-12, 1999; pp. 484-486.*

*Primary Examiner*—Paul D. Kim
(74) *Attorney, Agent, or Firm*—Oliff & Berridge, PLC (57) ABSTRACT

A method of manufacturing a magnetic circuit for an electrical machine, the method comprising:
  using a cutting station to cut out at least one strip of sectors that are interconnected by deformable connections; and
  using a winding station to wind the strip of sectors around a mandrel;
  wherein, between the cutting station and the winding station, there is a zone configured to enable the strip to deform so as to compensate for a difference in speed between a speed of the strip at an outlet from the cutting station and its speed at an inlet to the winding station.

40 Claims, 4 Drawing Sheets

U.S. PATENT DOCUMENTS

| | | | |
|---|---|---|---|
| 6,226,856 B1 | 5/2001 | Kazama et al. | 29/596 |
| 6,402,004 B1 * | 6/2002 | Yoshikuni et al. | 225/2 |
| 6,429,568 B1 | 8/2002 | Shen et al. | 310/254 |
| 2001/0015006 A1 | 8/2001 | Vohlgemuth | 29/590 |

FOREIGN PATENT DOCUMENTS

| | | | |
|---|---|---|---|
| DE | 2037752 B * | 6/1976 |
| EP | 0 072 999 A1 | 3/1983 |
| EP | 1 120 882 A2 | 8/2001 |
| FR | 2 171 398 | 9/1973 |
| JP | 55103061 A * | 8/1980 |
| JP | 59 188356 | 10/1984 |
| JP | 60106349 A * | 6/1985 |

\* cited by examiner

FIG_1

FIG_2

FIG_3

FIG_4

FIG_5

FIG_6

FIG_7

METHOD OF MANUFACTURING A CIRCUIT FOR AN ELECTRICAL MACHINE

The present invention relates to a method and a machine for manufacturing a magnetic circuit for an electrical machine.

BACKGROUND OF THE INVENTION

It is known to make the magnetic circuits of electrical machines by stacking magnetic laminations. For relatively powerful electrical machines, a large press is required in order to cut the laminations out from sheet metal, given the size of each lamination.

There therefore exists a need to reduce the cost of manufacturing a magnetic circuit for an electrical machine, in particular by making it possible to use a smaller press and by reducing the time required for manufacture.

European patent application EP-A2-1 120 882 discloses a method of manufacturing a magnetic circuit for an electrical machine which consists in making a strip of lamination sectors and then winding the strip on a mandrel.

OBJECTS AND SUMMARY OF THE INVENTION

In one of its aspects, the invention provides a method of manufacturing a magnetic circuit for an electrical machine, the method comprising:
  using a cutting station to cut out at least one strip of sectors that are interconnected by deformable connections; and
  using a winding station to wind the strip of sectors around a mandrel;
  the method being characterizable by the fact that between the cutting station and the winding station, there is a zone configured to enable the strip to deform so as to compensate for a difference in speed between the speed of the strip at an outlet from the cutting station and its speed at an inlet to the winding station.

By means of the invention, the magnetic circuit of the electrical machine can be made continuously by cutting and winding a strip of sheet metal.

The method of the invention is suitable for making a stator, or a rotor, or a magnetic circuit for a static electrical machine such as a transformer, for example.

The invention also makes it possible to use different materials for the stator and for the rotor, for example relatively expensive high permeability metal for the stator and less expensive metal for the rotor, given that material losses are reduced.

In another aspect of the invention, at least a portion of the strip of sectors is kept under tension in the above-mentioned zone by means of a tensioning element. This zone advantageously includes a plurality of rollers caused to rotate other than by the travel of the strip, for example rollers rotated by a motor. The rollers are advantageously driven at a speed that is greater than the travel speed of the strip so as to subject it to a certain amount of tension by friction.

The rollers, which may be placed transversely relative to the direction of advance of the strip, may turn about axes at increasing angles of inclination relative to a reference axis that is substantially perpendicular to the direction of advance of the strip at the outlet from the cutting station.

The rollers may be rotated at a speed that increases on approaching the winding station.

The above-mentioned zone may be configured in such a manner that the path of the strip of sectors therethrough is substantially horizontal. In particular, the zone may be configured in such a manner that the strip of sectors follows a curvilinear path therethrough.

By way of example, the length of the curvilinear path followed by the strip may increase with increasing speed of the strip at the outlet from the cutting station.

In a particular implementation of the invention, the position of the strip within the zone is detected, and at least the speed of the strip at the inlet to the winding station and/or at the outlet of the cutting station may be modified as a function of the detected position.

It is possible to detect the presence of the strip at at least two points of the zone and to modify the speed of the strip at the inlet to the winding station and/or at the outlet from the cutting station so that the traveling strip remains between said points. For example, it is possible to use a set of two inductive sensors and to servo-control the speed at which the mandrel is rotated to the cutting speed and to the detected position of the strip.

In a particular implementation of the invention, the mandrel is rotated so as to allow the strip to be wound around it.

It is possible to move the mandrel vertically as the stack builds up, for example by lowering the mandrel, so that the sectors continue to be engaged on the mandrel at a height that is substantially constant.

In a particular implementation of the invention, the sectors are cut out by means of a press operating at a rate of more than 100 strokes per minute, for example at a rate of more than 150 strokes per minute.

The sectors may be cut out by means of a press exerting thrust of less than 500 (metric) tonnes, for example of less than 200 tonnes, and more preferably of about 125 tonnes. Such a press can operate at a relatively high rate.

In a particular implementation, the sectors are cut out while using a lubricant, and the lubricant is removed during a drying step prior to the strip reaching the above-specified zone. This removal may be performed, for example, in a dryer situated at the outlet from the press.

In an aspect of the invention, wheels may be used to press the sectors against the portion of the strip that has already been wound on the mandrel.

The sectors may be cut out in such a manner that the deformable connections interconnecting sectors are situated at the outer periphery of the wound strip on the mandrel, and the sectors may be pressed radially against the mandrel by means of at least one toothed wheel whose teeth are configured in such a manner as to engage against the deformable connections interconnecting the sectors.

The presence of deformable connections on the outside of the sectors enables contact between sectors to be improved, since these connection portions which extend beyond the plane of the sectors do not impede stacking. A strip of sheet metal sectors for making a magnetic circuit for an electrical machine having such connections is described in European patent application No. EP-A2-1 120 882.

In a particular implementation of the invention, each sector has at least one tooth and, while the strip of sectors is being wound on the mandrel, at least one pawl is periodically engaged in the slots in the sectors so as to align the teeth to be superposed in a direction parallel to the winding axis, the pawl being suitable for moving between a projecting position in which it can co-operate with the strip of sectors, and a retracted position in which it does not interfere with the placing of sectors on the mandrel.

The end of each pawl may be configured in such a manner as to co-operate with slots formed between two adjacent teeth of the sectors.

Each pawl may be secured to at least one wheel suitable for moving along at least one camming path of a shape that controls the displacement of the pawl between said projecting and retracted positions as a function of rotation of the mandrel.

Each pawl may be secured in particular to a wheel at each of its top and bottom ends.

In a particular implementation of the invention, the shape of each camming path enables all of the pawls to be placed in the same projecting or retracted position for a predetermined angular position of the mandrel.

Each camming path may thus be configured so that all of the pawls pass from the projecting position to the retracted position or vice versa for the mandrel turning through 1/2n of a turn, the number of pawls being equal to n, where n is equal to 8, for example.

The method may further comprise the following steps:
placing all of the pawls in the projecting position; and
using a presser plate to press axially against the portion of the strip that is wound around the mandrel, in particular in preparation for locking the various layers of the stacks together by welding.

In a particular implementation of the invention, at least one bar extending parallel to the winding axis may be welded in a welding station to the winding that is in place on the mandrel. This bar may be constituted by a channel section member having two flanges which are positioned on opposite sides of one or more rows of deformable connections interconnecting the sectors. This bar contributes to keeping the stack together once it has been removed from the mandrel. Eight bars may be used, for example. The length of a bar is not less than the length of the stack, for example it may lie in the range 300 millimeters (mm) to 700 mm, for example being close to 500 mm.

The welding station may be independent of the winding station.

The mandrel may be transferred from the winding station to the welding station by means of a rotary arm.

It is also possible to perform this transfer manually.

The welding station may have one or more welding torches suitable for being displaced parallel to the stacking axis, and in particular vertically.

In a particular implementation of the invention, the method may further comprise the following steps:
placing all the pawls in the retraced position within the mandrel; and
extracting the winding from the mandrel.

In another aspect, the invention also provides a machine for manufacturing a magnetic circuit for an electrical machine, in particular for implementing the above-specified method, said machine comprising a mandrel on which a strip of sectors can be wound, said mandrel having at least one pawl suitable, while the strip of sectors is being wound, for moving between a projecting position in which each pawl can co-operate with the strip of sectors and a position in which it is at least partially retracted and in which it does not impede the positioning of sectors on the mandrel.

The mandrel may turn about a stationary core, said core having at least one camming path, and each pawl may be secured to at least one member engaged in said path so that the pawls are suitable for moving between said projecting and retracted positions as a function of the rotation of the mandrel.

By way of example, the machine may comprise at least as many pawls as there are sectors per turn, in particular eight pawls. The outside diameter of the mandrel lies in the range 200 mm to 400 mm, for example, e.g. being greater than or equal to about 300 mm.

The mandrel may be mounted on an elevator, in particular a motor-driven device or an actuator device so as to be suitable for being moved axially in such a manner as to maintain the top face of the winding at substantially the same height throughout the period during which sectors are being stacked.

The mandrel may be interchangeable.

The machine may include a carousel carrying a plurality of mandrels, e.g. mandrels of different dimensions.

The machine may include a conveyor configured to allow the mandrel to be fed with a strip of sectors coming from a cutting station while also enabling the strip to deform in such a manner as to compensate for a difference in speed between the speed of the strip on leaving the cutting station and its speed on entering the winding station.

Such a conveyor may have two walls each including at least one curvilinear portion between which the strip can travel. These two walls may be spaced apart by a distance that increases and then decreases on going from the cutting station towards the winding station.

The conveyor may include rollers suitable for being driven in rotation and extending beyond at least one of the walls, e.g. for the purpose of co-operating with a drive mechanism.

The conveyor may be wide enough to allow different types of sector strip to travel between its walls, for example strips of different dimensions and/or shapes.

The machine may include a toothed wheel mounted on a retractable arm, the wheel being designed to be rotated during winding of the strip because of its teeth engaging on the deformable connections interconnecting sectors.

BRIEF DESCRIPTION OF THE DRAWINGS

Other characteristics and advantages of the present invention appear on reading the following detailed description of non-limiting embodiments of the invention, and on examining the accompanying drawings, in which.

MORE DETAILED DESCRIPTION

Figures 1, 2:
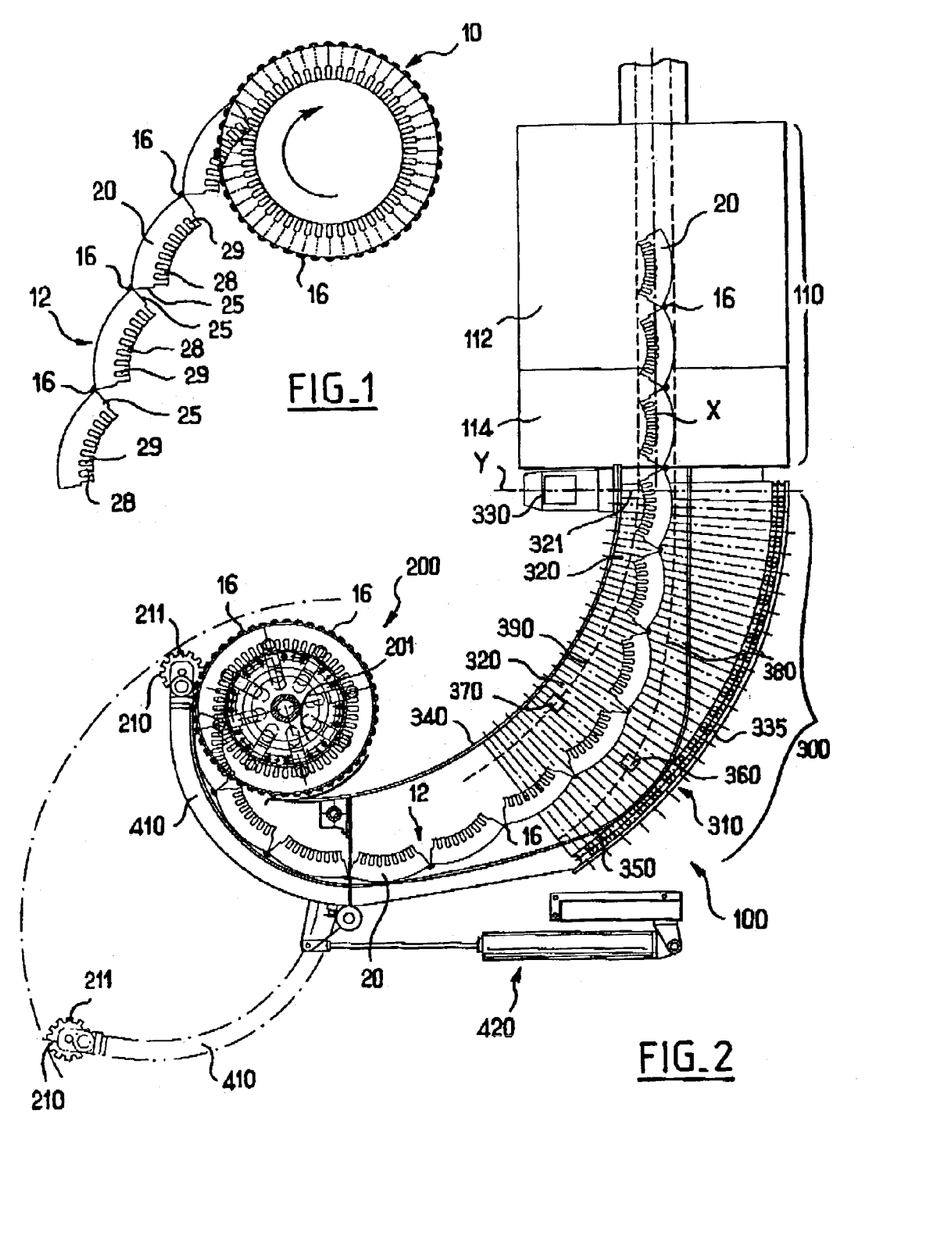
FIG. 1 is a diagrammatic plan view showing a strip of sectors being wound.
FIG. 2 is a fragmentary diagrammatic plan view showing a machine enabling a magnetic circuit to be manufactured.

FIG. 1 shows a portion 10 of a stator magnetic circuit for a rotary electrical machine, the magnetic circuit being built up by winding a strip 12 of sectors 20 of sheet metal on a mandrel (not shown), which mandrel is rotated about an axis perpendicular to the panel of the figure.

The sectors 20 are interconnected by deformable connections 16 made integrally with the sectors 20 by a cutting-out operation. The bridge of material constituting each deformable connection 16 may be of various shapes, for example it may include a middle portion of constant width. It may also include on either side on the middle portion two narrow portions for creating preferred deformation zones, or it may comprise a middle portion defined radially by two concentric circular edges. Reference can be made to application EP-A2-1 120 882 for a more detailed description of examples of deformable connections that may be implemented between sectors.

As shown in the example of FIG. 1, the connections 16 may project outwards from the sectors, i.e. they may extend beyond the outside diameter of the stacked sectors.

The sectors 20 also comprise teeth 28 separated by slots 24 for receiving the conductor wires of stator windings, in conventional manner.

In the example shown in FIG. 1, the separation between two sectors takes place in the middle of a slot 29, but it would not go beyond the ambit of the invention for the separation between sectors to be situated other than in the middle of a slot, for example in a tooth 28.

On examining FIG. 1, it will be understood that the connections 16 between the sectors 20 are not superposed from one layer of sectors to the next. This ensures that the connections between sectors in two adjacent layers do not come into contact with one another, which would impede stacking of the sectors.

The edges 25 of the sectors are brought into contact with one another during the winding operation on the mandrel.

A machine 100 for making a magnetic circuit by winding a strip of sectors of the kind described with reference to FIG. 1 is itself described below with reference to FIG. 2.

The machine 100 comprises a cutting and drying station 110 enabling at least one strip of sectors interconnected by deformable connections to be made by being cut out from a reel of sheet metal, followed by a winding station 200 containing a mandrel 201.

The station 110 has a press 112 for cutting sectors out from the strip of sheet metal and a dryer 114 for removing a lubricant used during the sector cutting-out operation.

In the example shown, the press 112 operates at a rate in excess of 100 strokes per minute, for example about 160 strokes per minute.

In the example described, the press 112 cuts out a single sector 20 at a time, however it would not go beyond the ambit of the present invention to use a press suitable for cutting out a plurality of sectors simultaneously.

The speed of the strip on leaving the station 110 is discontinuous, with the strip 12 advancing in jerks where it leaves the station 110.

The machine 100 has a zone 300 that is configured to enable the strip 12 to deform so as to compensate for a difference in speed between the speed of the strip at the outlet from the station 110 and its speed at the inlet to the winding station 200.

The zone 300 comprises a conveyor 310 having rollers 320 rotated by a motor 330 via drive means 335.

The rollers 320 are slightly conical, turning about respective horizontal axes at increasing angles of inclination relative to a reference axis Y, said axis Y being substantially perpendicular to the direction of advance X of the strip 12 at the outlet from the station 110.

The rollers 320 are disposed substantially transversely relative to the direction of advance of the strip 12 and they are driven at their larger-diameter ends by the motor 330 so as to rotate at speeds that increase on going away from the station 110.

The strip 12 is placed freely on the rollers 320 and travels substantially horizontally towards the mandrel 201. By driving the rollers at a speed that is higher than the mean speed at the outlet from the press, and in the example described at ever increasing speeds, it is possible to keep the strip 12 under tension as it travels through the zone 300 because there is friction between the rollers 320 and the sectors 20.

The conveyor 310 is generally curvilinear in shape and has two walls 340 and 350 which are vertical in the example described, each wall comprising at least one curvilinear portion. These two walls 340 and 350 are spaced apart by a distance that increases on going away from the station 110, reaching a maximum substantially halfway between the station 110 and the station 200, and subsequently decreasing on approaching the station 200.

When the speed at the outlet from the station 110 is slower than the speed at the inlet to the winding station 200, the strip 12 travels through the conveyor 310 while approaching the wall 340. Conversely, when the speed of the strip 12 at the outlet from the station 110 is higher than its speed at the inlet to the winding station, the strip 12 travels through the conveyor 310 coming closer to the wall 350. The connections 16 enable, the strip 12 to deform and move back and forth between the walls 340 and 350.

In the example shown, the zone 300 includes detectors 360 and 370 for detecting the position of the strip between the walls 340 and 350.

By way of example, these detectors 360 and 370 are inductive sensors which detect the presence of the strip in their immediate vicinity, which occurs only when the strip is following respective curvilinear paths 380 and 390.

When the strip 12 reaches one of the detectors 360 and 370, a servo-control device (not shown) modifies the winding speed at the mandrel 201. Thus, when the strip reaches the detector 360, the winding speed at the mandrel 201 is accelerated. In analogous manner when the strip 12 reaches the detector 370, the winding speed around the mandrel is slowed down.

It is also possible to determine the position of the strip in the zone 300, in a variant or in addition, by using optical sensors or any other appropriate type of sensor.

The strip 12 leaving the zone 300 is wound around the mandrel 201. The strip is pressed against the mandrel 201 by a toothed wheel 210 having teeth 211 which co-operate with the stacks of connections 16 interconnecting the sectors 20 of the strip 12. The wheel 210 is thus caused to rotate while the strip is being wound.

The wheel 210 is fixed on a rotary arm 410 capable of being moved away from the mandrel 201 under drive from an actuator 420 so as to take up the position shown in chain-dotted lines in FIG. 2. The wheel 210 is moved away from the mandrel once stacking has been completed, so as to enable the stack to be extracted from the mandrel.

Figure 3:
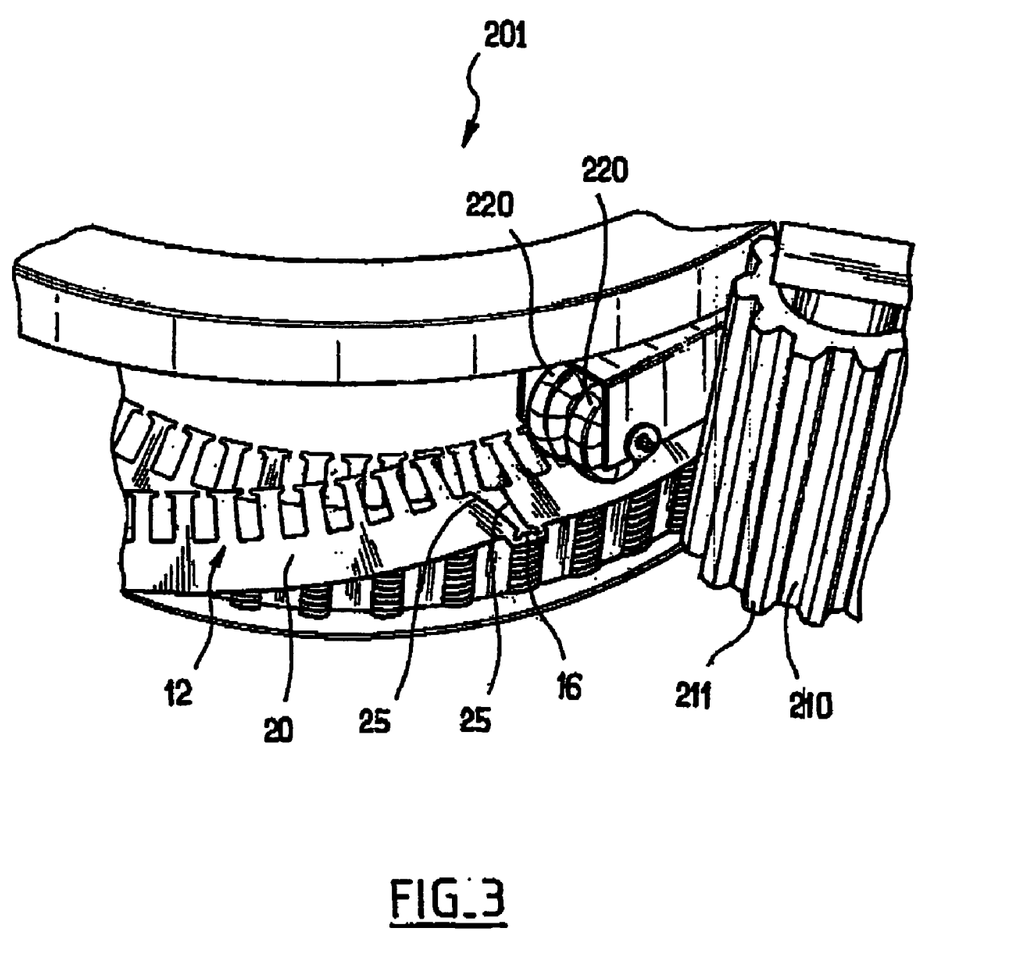
FIG. 3 is a fragmentary diagrammatic perspective view showing a detail of the FIG. 2 machine.

The strip 12 of sectors 20 is pressed against the already-wound portion of the strip by means of a set of rotary wheels 220, as shown in FIG. 3.

The mandrel 201 is lowered as the strip is being wound by means of a motor-driven device situated at its base or by means of an actuator device (not shown in FIG. 2), so as to ensure that the top layer of the stack remains at substantially the same height throughout the stacking operation.

Figure 4:
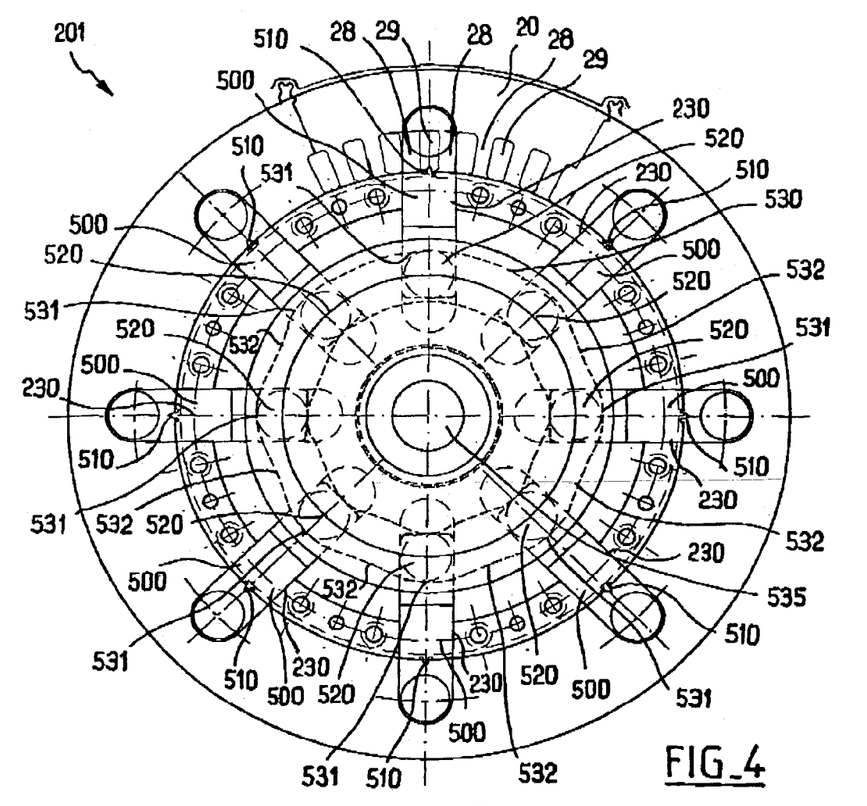
FIG. 4 is a fragmentary diagrammatic plan view of the mandrel of the FIG. 2 machine.

The teeth 28 of the sectors 20 of the strip 12 are positioned on the mandrel 201 by means of pawls 500, as shown in FIG. 4. These pawls, which are eight in number in the example shown, are omitted from FIG. 3 in order to clarify the drawing.

Each pawl 500 is suitable for sliding in a corresponding housing 230 in the mandrel 201.

Each pawl 500 has one end 510 which extends along substantially the full length of the mandrel and which is suitable for co-operating with the ends of two teeth 28 situated on either side of a slot 29 in a sector 20 so as to align the teeth with teeth in the layers that have already been stacked, in a direction parallel to the winding axis.

At each of their top and bottom ends, the pawls 500 are secured to respective wheels 520 suitable for traveling along camming paths 530 made in a central portion 535 which is stationary relative to the rotary peripheral portion of the mandrel 201. Each camming path 530 is of a shape enabling the pawls to move between a projecting position in which their ends 510 co-operate with the teeth 28 beside the slots 29, and a position in which they are at least partially retracted into the mandrel 201 so as to avoid interfering with the docking of sectors 20 against the mandrel 201.

Each pawl 500 is in a projecting position when the corresponding wheels 520 are in a portion 531 of the camming paths 530, as shown in FIG. 4.

Each pawl 500 is in a retracted position (not shown) when the corresponding wheels 520 are in a portion 532 of the camming paths 530 which is closer to the center of rotation of the mandrel 201 than is the portion 531.

The portions 531 and 532 alternate regularly, and there are as many pairs of portions 531 and 532 as there are pawls 500. All of the pawls 500 can occupy the same projecting or retracted position simultaneously, and the system goes from one position to another by causing the mandrel to turn through ½n of a turn where n designates the number of pawls.

Figure 5:
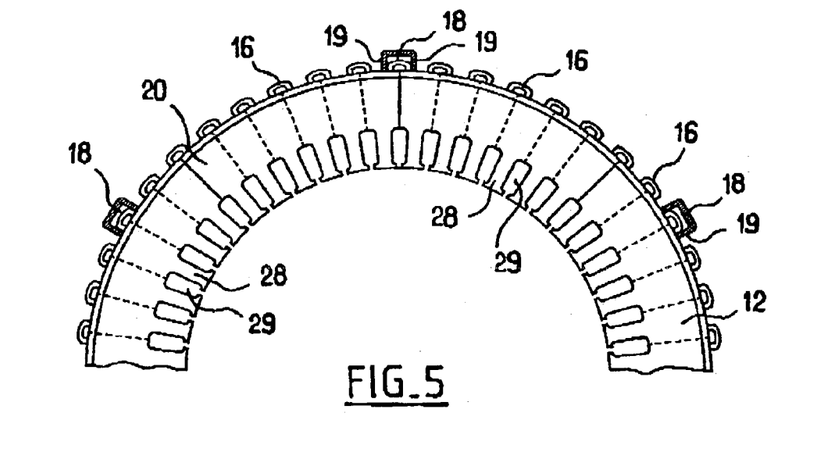
FIG. 5 is a fragmentary diagrammatic view of a magnetic circuit.

Once winding has been completed, a magnetic circuit is obtained whose outside circumference presents vertical stacks of connections 16, as shown in FIG. 5. In order to hold the stack together, channel-section bars 18 having pairs of flanges 19 are positioned on either side of a vertical row of connections 16 and welded to the stack.

In the example shown in FIG. 5, each bar 18 is placed astride a single row of connections 16, but it would not go beyond the ambit of the present invention for the bars 18 to be wider so that each of them covers a plurality of vertical rows of connections 16.

The bars 18 can be fixed to the stack in a welding station that can be separate from the winding station.

Figure 6:
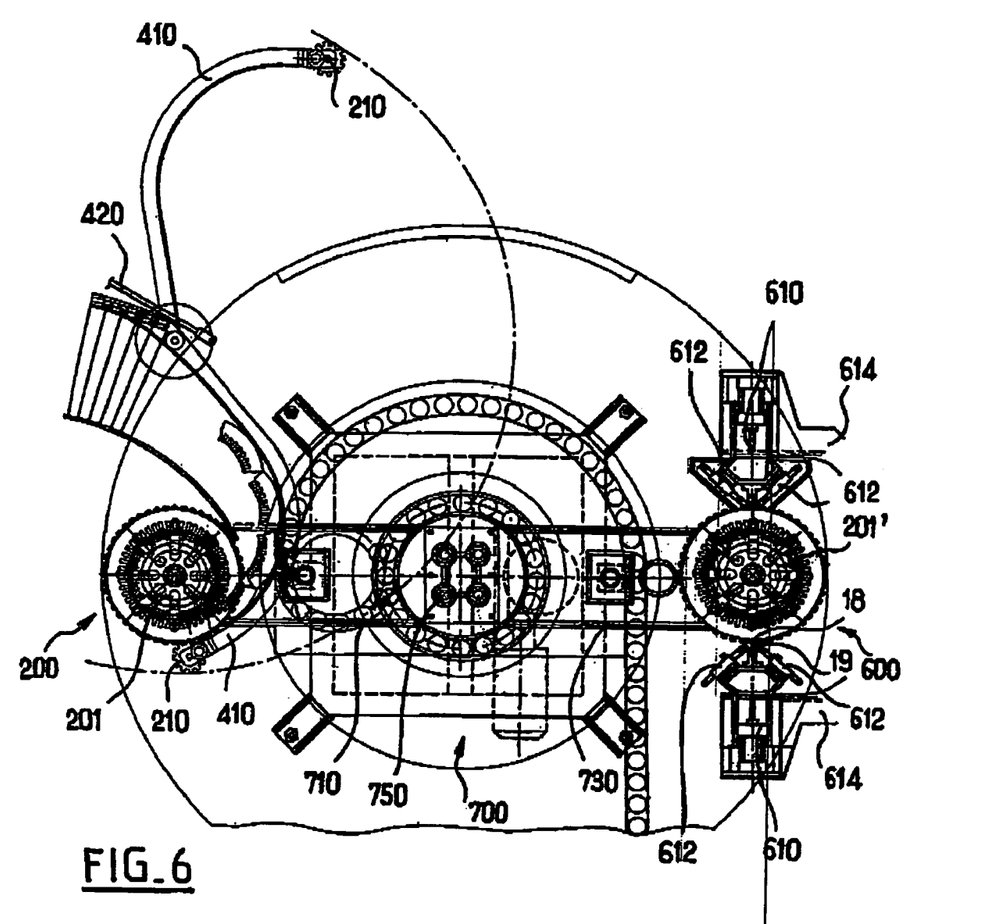
FIG. 6 is a fragmentary diagrammatic plan view of another example of the machine.

FIG. 6 shows a welding station 600 that is independent from the winding station.

The mandrel 201 is supported by a rotary arm 710. A second mandrel 201' is fixed to a rotary arm 730 diametrically opposite the arm 710. The two arms 710 and 730 are connected to a hub 700 capable of being turned about a vertical axis, and capable of being moved vertically by actuators or by a motor-driven device 750 while a strip of sectors is being wound onto a mandrel 201 or 201'.

Once winding around the mandrel 201 has been completed, the winding is pressed together by means of a presser plate (not shown) and the hub 700 is then turned through 180° about its axis so as to bring the mandrel 201 to the location previously occupied by the mandrel 201' in the welding station 600.

The bars 18 are then placed over the connections 16 as shown in FIG. 5, and welded by means of two welding devices 610, each carrying two welding torches 612 placed at 90° relative to each other, enabling each of the flanges 16 of a bar 18 to be welded to the stack.

The mandrel placed in the welding station is suitable for being rotated by a device (not shown) to enable a plurality of bars 18 to be welded on in succession.

The mandrel 201' is moved axially during welding of the bars 18 by the actuators or by the same motor-driven device 750 as was used for keeping the laying level at constant height. Welding can take place on one of the mandrels 201 or 201' substantially at the same time as a strip of sectors is being wound on the other mandrel.

Each of the welding devices 610 is carried by a rotary retractable arm 614 enabling the welding devices to be moved away from the mandrel 201' in order to extract the stack once welding has been completely finished.

The mandrel could equally well be transferred from the winding station to the welding station manually, without that going beyond the ambit of the invention.

Figure 7:
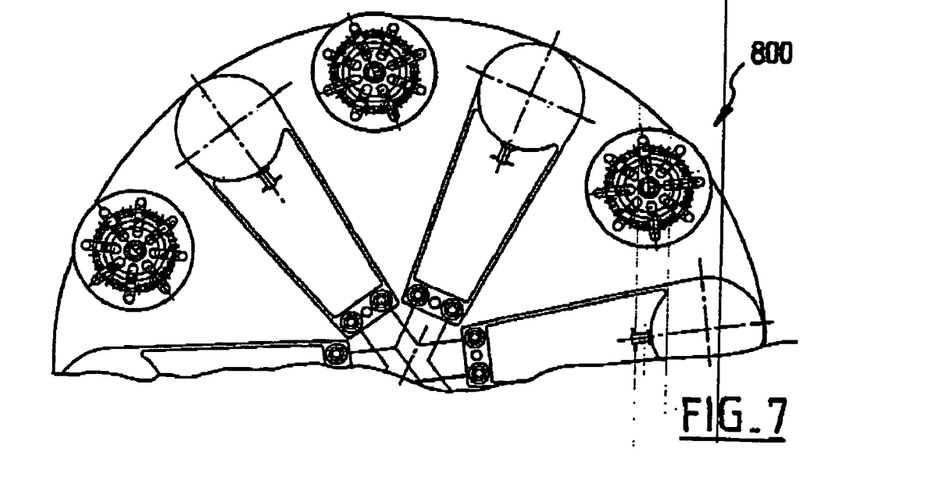
FIG. 7 is a fragmentary diagrammatic plan view of another example of the machine.

It would not go beyond ambit of the present invention for the machine to include a carousel 800 supporting a plurality of mandrels, possibly of different sizes and shapes, the carousel being shown in part in FIG. 7.

What is claimed is:

1. A method of manufacturing a magnetic circuit for an electrical machine, the method comprising:
   using a cutting station to cut out at least one strip of sectors that are interconnected by deformable connections; and
   using a winding station to wind the strip of sectors around a mandrel;
   wherein, between the cutting station and the winding station, there is a zone configured to enable the strip to deform so as to compensate for a difference in speed between a speed of the strip at an outlet from the cutting station and a speed of the strip at an inlet to the winding station; and
   wherein at least a portion of the strip of sectors is maintained under tension in said zone by means of at least one tensioning element.

2. The method according to claim 1, wherein said zone has a plurality of rollers rotated other than by a travel of the strip.

3. The method according to claim 2, wherein said rollers turn about axes at increasing angles of inclination relative to a reference axis substantially perpendicular to the direction of advance of the strip at the outlet from the cutting station.

4. The method according to claim 1, wherein said zone is configured in such a manner that a path of the strip of sectors in said zone is substantially horizontal.

5. The method according to claim 1, wherein said zone is configured in such a manner that the strip of sectors follows a curvilinear path therein.

6. The method according to claim 2, wherein the mandrel is moved vertically as a stack is built up.

7. The method according to claim 6, wherein the sectors are cut out by means of a press operating at a rate of more than 100 strokes per minute, and in particular at a rate of more than 150 strokes per minute.

8. The method according to claim 7, wherein said press exerts a thrust of less than 500 tonnes, and in particular of about 125 tonnes.

9. The method according to claim 1, wherein the sectors are pressed by means of wheels against a portion of strip that has already been wound on the mandrel.

10. The method according to claim 2, wherein the mandrel is transferred between the winding station and a welding station by means of a rotary arm.

11. The method according to claim 1, the strip of sectors extending in a plane in the zone of deformation.

12. The method according to claim 1, the strip of sectors extending in the zone of deformation perpendicularly to a winding axis.

13. A method of manufacturing a magnetic circuit for an electrical machine, the method comprising:
using a cutting station to cut out at least one strip of sectors that are interconnected by deformable connections; and
using a winding station to wind the strip of sectors around a mandrel;
wherein, between the cutting station and the winding station, there is a zone configured to enable the strip to deform so as to compensate for a difference in speed between a speed of the strip at an outlet from the cutting station and a speed of the strip at an inlet to the winding station; and
wherein a position of the strip in the zone is detected, and at least a speed of the strip at the outlet from the cutting station and/or at the inlet to the winding station is modified as a function of the detected position.

14. The method according to claim 13, wherein a presence of the strip is detected at at least two points in said zone, and wherein the speed of the strip at the inlet to the winding station and/or at the outlet from the cutting station is modified in such a manner as to cause the strip to travel between said points.

15. The method according to claim 14, wherein the mandrel is rotated in order to enable the strip to be wound thereabout.

16. A method of manufacturing a magnetic circuit for an electrical machine, the method comprising:
using a cutting station to cut out at least one strip of sectors that are interconnected by deformable connections; and
using a winding station to wind the strip of sectors around a mandrel;
wherein, between the cutting station and the winding station, there is a zone configured to enable the strip to deform so as to compensate for a difference in speed between a speed of the strip at an outlet from the cutting station and a speed of the strip at an inlet to the winding station; and
wherein the sectors are cut out while using a lubricant, and that the lubricant is removed by drying prior to the strip reaching said zone.

17. A method of manufacturing a magnetic circuit for an electrical machine, the method comprising:
using a cutting station to cut out at least one strip of sectors that are interconnected by deformable connections; and
using a winding station to wind the strip of sectors around a mandrel;
wherein, between the cutting station and the winding station, there is a zone configured to enable the strip to deform so as to compensate for a difference in speed between a speed of the strip at an outlet from the cutting station and a speed of the strip at an inlet to the winding station; and
wherein the sectors are cut out in such a manner that the deformable connections interconnecting the sectors are situated at the outer periphery of the winding and wherein the sectors are pressed radially against the mandrel by means of a toothed wheel whose teeth are configured in such a manner as to be capable of engaging on the deformable connections.

18. A method of manufacturing a magnetic circuit for an electrical machine, the method comprising:
using a cutting station to cut out at least one strip of sectors that are interconnected by deformable connections; and
using a winding station to wind the strip of sectors around a mandrel;
wherein, between the cutting station and the winding station, there is a zone configured to enable the strip to deform so as to compensate for a difference in speed between a speed of the strip at an outlet from the cutting station and a speed of the strip at an inlet to the winding station; and
wherein each sector has at least one tooth and wherein, during winding of the strip of sectors on the mandrel, at least one pawl is periodically engaged in slots of the sectors so as to align the teeth which are superposed in a direction parallel to a winding axis, said pawl being suitable for moving between a projecting position in which the pawl is capable of co-operating with the strip of sectors and a retracted position in which the pawl does not impede the placing of sectors on the mandrel.

19. The method according to claim 18, wherein said at least one pawl is secured to at least one wheel suitable for traveling in at least one camming path of a shape that controls the displacement of the pawl between said projecting and retracted positions as a function of the rotation of the mandrel.

20. The method according to claim 19, wherein the camming path is configured in such a manner that all of the pawls pass from the projecting position to the retracted position or vice versa when the mandrel turns through $\frac{1}{2}n$ of a turn, and wherein the number of pawls is equal to n, and in particular is equal to 8.

21. The method according to claim 19, wherein a shape of each camming path enables all of the pawls to be disposed in the same projecting or retracted position for a predetermined angular position of the mandrel.

22. The method according to claim 21, further comprising the following steps:
placing all of the pawls in the projecting position; and
pressing a portion of strip that is wound around the mandrel in an axial direction by means of a presser plate.

23. The method according to claim 21, further comprising the following steps:
placing all of the pawls in the retracted position within the mandrel; and
extracting the winding from the mandrel.

24. A method of manufacturing a magnetic circuit for an electrical machine, the method comprising:
using a cutting station to cut out at least one strip of sectors that are interconnected by deformable connections; and
using a winding station to wind the strip of sectors around a mandrel;
wherein, between the cutting station and the winding station, there is a zone configured to enable the strip to deform so as to compensate for a difference in speed between a speed of the strip at an outlet from the cutting station and a speed of the strip at an inlet to the winding station; and
wherein at least one bar extending parallel to a winding axis is welded to the winding in place on the mandrel in a welding station.

25. The method according to claim 24, wherein a length of the bar is not less than a length of the stack, and in particular lies in the range 300 mm to 700 mm.

26. The method according to claim 24, wherein said bar is constituted by a channel-section member having two flanges which are positioned on opposite sides of one or more aligned rows of deformable connections interconnecting sectors.

27. The method according to claim 24, wherein the welding station is independent of the winding station.

28. A machine for manufacturing a magnetic circuit for an electrical machine, the machine comprising:
- means for cutting out at least one strip of sectors that are interconnected by deformable connections; and
- means for winding the strip of sectors around a mandrel;
- wherein, between the means for cutting out and the means for winding, there is a zone configured to enable the strip to deform so as to compensate for a difference in speed between a speed of the strip at an outlet from the cutting station and a speed of the strip at an inlet to the winding station, and
- wherein at least a portion of the strip of sectors is maintained under tension in said zone by means of at least one tensioning element.

29. The machine for manufacturing a magnetic circuit for an electrical machine according to claim 28, the machine further comprising:
- the mandrel, said mandrel having at least one pawl suitable, while the strip of sectors is being wound, for moving between a projecting position in which each pawl can co-operate with the strip of sectors and a position in which each pawl is at least partially retracted and in which each pawl does not impede the positioning of the sectors on the mandrel.

30. The machine according to claim 29, wherein the mandrel turns about a stationary core, said core having at least one camming path, and wherein each pawl is secured to at least one member engaged in said path so that the pawls are suitable for moving between said projecting and retracted positions as a function of the rotation of the mandrel.

31. The machine according to claim 29, having a number of pawls that is not less than the number of sectors per turn, and in particular eight pawls.

32. The machine according to claim 29, wherein an outside diameter of the mandrel lies in the range 200 mm to 400 mm, and in particular is greater than or equal to about 300 mm.

33. The machine according to claim 29, wherein the mandrel is mounted on an elevator device, in particular a motor-driven or actuator device so that it is suitable for being moved axially in such a manner as to maintain the top face of the winding at substantially a same height throughout the entire duration of sector stacking.

34. The machine according to claim 29, wherein the mandrel is interchangeable.

35. The machine according to claim 29, including a conveyor configured to feed the mandrel with a strip of sectors coming from a cutting station while also allowing the strip to deform so as to compensate for a difference in speed between a speed of the strip at an outlet from the cutting station and its speed at an inlet to the winding station.

36. The machine according to claim 35, wherein said conveyor has two walls each having at least one curvilinear portion between which the strip can travel.

37. The machine according to claim 36, wherein said two walls of the conveyor are spaced apart by a distance which increases and then decreases on going from the cutting station to the winding station.

38. The machine according to claim 35, wherein the conveyor has rollers suitable for being rotated and extending beyond at least one of the walls in order to co-operate with a drive mechanism.

39. The machine according to claim 29, including a toothed wheel mounted on a retractable arm and suitable for being rotated during winding of the strip because of the deformable connections interconnecting the sectors engaging between the teeth of the wheel.

40. A machine for manufacturing a magnetic circuit for an electrical machine, the machine comprising:
- means for performing the method according to claim 1, the means comprising a mandrel on which a strip of sectors can be wound, said mandrel having at least one pawl suitable, while the strip of sectors is being wound, for moving between a projecting position in which each pawl can co-operate with the strip of sectors and a position in which each pawl is at least partially retracted and in which each pawl does not impede the positioning of sectors on the mandrel.

* * * * *